US012728375B2

(12) United States Patent
Dirnberger et al.

(10) Patent No.: US 12,728,375 B2
(45) Date of Patent: Sep. 8, 2026

(54) FILTER AND CLAMPING WEDGE FOR A FILTER

(71) Applicant: MANN+HUMMEL GmbH, Ludwigsburg (DE)

(72) Inventors: Timo Dirnberger, Marbach (DE); Bernd Joos, Lorch (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 400 days.

(21) Appl. No.: 18/362,491

(22) Filed: Jul. 31, 2023

(65) Prior Publication Data

US 2024/0033670 A1 Feb. 1, 2024

(30) Foreign Application Priority Data

Jul. 29, 2022 (DE) ......................... 102022119073.0

(51) Int. Cl.
*B01D 46/00* (2022.01)
*B01D 46/52* (2006.01)

(52) U.S. Cl.
CPC ....... *B01D 46/0006* (2013.01); *B01D 46/521* (2013.01); *B01D 2265/025* (2013.01); *B01D 2265/028* (2013.01); *B01D 2271/022* (2013.01); *B01D 2279/60* (2013.01)

(58) Field of Classification Search
CPC ........ B01D 2265/025; B01D 2265/028; B01D 46/0005; B01D 46/0006; B01D 46/10; B01D 46/521; B01D 2271/022; B01D 2279/60
See application file for complete search history.

(56) References Cited

U.S. PATENT DOCUMENTS

| | | | |
|---|---|---|---|
| 5,030,264 | A | 7/1991 | Klotz et al. |
| 6,217,627 | B1 | 4/2001 | Vyskocil et al. |
| 6,497,685 | B1 | 12/2002 | Dennehey et al. |
| 6,780,217 | B1 | 8/2004 | Palmer |
| 7,597,735 | B2 | 10/2009 | Terres et al. |
| 7,972,405 | B2 | 7/2011 | Engelland et al. |
| 9,108,132 | B2 | 8/2015 | Menssen et al. |
| 2002/0020156 | A1 | 2/2002 | Goerg |

(Continued)

FOREIGN PATENT DOCUMENTS

| | | | |
|---|---|---|---|
| DE | 4234047 | C1 | 8/1993 |
| DE | 4344269 | A1 | 7/1994 |

(Continued)

*Primary Examiner* — Robert Clemente

(57) ABSTRACT

A gaseous fluid filter has a filter element insertable into the filter housing through a service opening. A clamping wedge is insertable in a joining direction for clamping the filter element in clamping direction against the filter housing. The filter element rests against the filter housing with a seal surface facing away from the clamping wedge. The clamping wedge has a housing wedge side facing a housing stop and a filter element wedge side facing a filter element stop. These wedge sides each have first and second bearing surfaces separated by a step. The joining direction extends in or parallel to a contact plane between housing wedge side and housing stop. The first and/or second bearing surface of the filter element wedge side is positioned at a wedge base angle of 1° to 20° to the joining direction. The steps of the wedge sides are offset in joining direction.

23 Claims, 6 Drawing Sheets

(56) References Cited

U.S. PATENT DOCUMENTS

2004/0020177 A1 2/2004 Ota et al.
2006/0107638 A1 5/2006 Holzmann et al.
2006/0288674 A1 12/2006 Amesoeder et al.
2007/0240394 A1 10/2007 Ehrenberg
2008/0022641 A1 1/2008 Engelland et al.
2008/0110146 A1 5/2008 Germain et al.
2008/0148695 A1 6/2008 Terres et al.
2008/0184685 A1 8/2008 Kempf et al.
2008/0216455 A1 9/2008 Aizawa et al.
2008/0314248 A1 12/2008 Peteln
2011/0099960 A1 5/2011 Menssen et al.
2011/0232242 A1 9/2011 Champion et al.
2015/0007530 A1 1/2015 Cho
2015/0040527 A1 2/2015 Cho et al.
2015/0075128 A1 3/2015 Schmid et al.
2017/0165600 A1 6/2017 Ishikawa
2017/0252688 A1 * 9/2017 Wuebbeling ....... F02M 25/0224
2022/0274041 A1 * 9/2022 Manley .................. B01D 46/10
2024/0252972 A1 * 8/2024 Hettkamp .......... B01D 46/0002

FOREIGN PATENT DOCUMENTS

DE 102004031609 A1 2/2006
DE 102014007413 A1 11/2015
DE 102015016447 A1 6/2017
DE 102015016447 B4 * 5/2023 ......... B01D 46/0006
EP 2692559 A1 2/2014
JP H08121272 A 5/1996
JP H09122417 A 5/1997
JP H11132117 A 5/1999
KR 101530186 B1 6/2015
KR 101557227 B1 10/2015
WO 10014713 A1 2/2010
WO 11029540 A1 3/2011

* cited by examiner

FILTER AND CLAMPING WEDGE FOR A FILTER

BACKGROUND OF THE INVENTION

The invention concerns a filter for filtering gaseous fluids with at least one filter element and a clamping wedge configured for clamping the filter element in a filter housing of the filter. The invention concerns furthermore a clamping wedge and a filter element for a filter.

Such filters are used, for example, for filtering air for internal combustion engines, vehicle interiors, and the like.

The employed filters comprise typically a filter element for separation of contaminants in the fluid to be filtered, for example, a filter for suspended particles. For an exchange of the filter element, the air filter often must be removed in a complex manner from the air guiding path. This increases the labor expenditure for the exchange of the filter element.

In order to counteract this disadvantage, some filters comprise a lateral service opening which enables the exchange of the filter element in the installed state of the filter. The filter element can be exchanged in these filters through the lateral service opening transversely to a flow direction through the filter element. In this context, a required contact pressure for pressing the filter element against the filter housing in the flow direction must be effected in order to prevent the fluid flow from bypassing the filter element. For this purpose, typically wedges are employed which are inserted through the lateral service opening into the filter housing and clamp the filter element in the filter housing.

DE 11 2007 002 845 B4 discloses an air filter in which a filter element arrangement can be introduced into a housing. The filter element arrangement is clamped in the housing by means of a bayonet. The bayonet forms in longitudinal direction a stepped bearing surface which effects pressing of the filter element arrangement against the housing.

DE 10 2010 047 491 B4 discloses a filter insert which comprises a plurality of bearing surfaces for clamping the filter insert at a filter housing. The bearing surfaces form different height profiles which effect the clamping of the filter insert in complementary engagement with clamping surfaces of a clamping element.

However, the aforementioned systems have in common a high force expenditure for insertion and/or detachment of the filter elements into or from the housing. The exchange of the filter element is made difficult thereby.

It is therefore an object of the invention to provide a filter and a clamping wedge with which a high contact pressure on a seal of the filter element can be achieved while an exchange of the filter element can be realized simply and quickly.

SUMMARY OF THE INVENTION

This object is solved by a filter for filtering gaseous fluids, comprising:

- a filter housing with a raw-side inlet opening, a clean-side outlet opening, and a service opening;
- a filter element arranged between the inlet opening and the outlet opening, which is removable from the filter housing and insertable into the filter housing through the service opening;
- a clamping wedge arranged, removable opposite to a joining direction, between a housing stop of the filter housing and a filter element stop of the filter element and clamping the filter element in a clamping direction against the filter housing;
- wherein the filter element at a side facing away from the clamping wedge rests with a seal surface against the filter housing;
- wherein the clamping wedge comprises a housing wedge side facing the housing stop and a filter element wedge side facing the filter element stop;
- wherein the housing wedge side and the filter element wedge side each comprise a first bearing surface and a second bearing surface which are separated by a step;
- wherein the joining direction extends in or parallel to a contact plane in which the housing wedge side is resting against the housing stop;
- wherein the first bearing surface and/or the second bearing surface of the filter element wedge side each are positioned at a wedge base angle relative to the joining direction which amounts to 1° to 20°, in particular 1.5° to 5°;
- wherein the at least one step of the housing wedge side is offset relative to the at least one step of the filter element wedge side in the joining direction.

Furthermore, the object is solved by a clamping wedge for clamping a filter element within a filter, in particular a filter according to the invention, wherein the clamping wedge in the mounted state comprises a housing wedge side facing the housing stop and a filter element wedge side facing the filter element stop;

- wherein the housing wedge side and the filter element wedge side each comprise a first bearing surface and a second bearing surface which are separated by a step;
- wherein the first bearing surface and/or the second bearing surface of the housing wedge side is embodied in or parallel to a joining direction of the clamping wedge;
- wherein the first bearing surface of the filter element wedge side and/or the second bearing surface of the filter element wedge side each are positioned at a wedge base angle relative to the joining direction which amounts to 1° to 20°, in particular 1.5° to 5°;
- wherein the at least one step of the housing wedge side is offset relative to the at least one step of the filter element wedge side in the joining direction.

The object is further solved by a filter element for arrangement in a filter according to the invention with a clamping wedge according to the invention, the filter element comprising:

- a seal surface which is resting in a mounted state of the filter element gas-tightly against a filter housing of the filter;
- a filter element stop at a side of the filter element facing away from the seal surface;
- wherein the filter element stop comprises a first filter element stop section configured to be contacted by the first bearing surface of the filter element wedge side of the clamping wedge and a second filter element stop section configured to be contacted by the second bearing surface of the filter element wedge side of the clamping wedge;
- wherein the first filter element stop section and the second filter element stop section are arranged offset relative to each other in the joining direction so that the step of the filter element wedge side of the clamping wedge can be received therebetween;
- and wherein the first filter element stop section and/or the second filter element stop section each are positioned at a stop section base angle relative to the joining direction which amounts to 1° to 20°, in particular 1.5° to 5°.

The dependent claims provide preferred further embodiments.

According to the invention, a filter is provided. The filter is suitable for filtering gaseous fluids. The filter comprises a filter housing with a raw-side inlet opening, a clean-side outlet opening, and a service opening. The service opening is preferably embodied laterally at the filter housing, in particular transversely to a flow direction through the filter.

The filter comprises furthermore a filter element. The filter element is arranged relative to a predetermined flow direction between the inlet opening and the outlet opening. The filter element is removable from the filter housing and insertable into the filter housing through the service opening. The filter element can be insertable, in particular like a drawer, into the filter housing. The filter element rests with a seal surface against the filter housing.

The filter comprises in addition a clamping wedge. The clamping wedge is arranged, removable opposite to a joining direction, between a housing stop of the filter housing and a filter element stop of the filter element. The clamping wedge clamps the filter element in a clamping direction at the filter housing. At a side facing away from the clamping wedge, the filter element typically rests with the seal surface against the filter housing. The clamping wedge comprises a housing wedge side which is facing the housing stop and a filter element wedge side which is facing the filter element stop.

The housing wedge side comprises a housing-facing first bearing surface and a housing-facing second bearing surface. The filter element wedge side comprises a filter element-facing first bearing surface and a filter element-facing second bearing surface. Preferably, the filter element wedge side comprises exclusively a filter element-facing first bearing surface and exclusively a filter element-facing second bearing surface. Further preferred, the housing wedge side comprises exclusively a housing-facing first bearing surface and exclusively a housing-facing second bearing surface. In other words, the filter element wedge side and/or the housing wedge side comprise exclusively two bearing surfaces, respectively. The bearing surfaces each can comprise two or more partial surfaces, wherein the partial surfaces of a bearing surface are positioned in a common plane. The partial surfaces of a common bearing surface can be spaced apart from each other by intermediate spaces.

According to the invention, the joining direction extends in or parallel to a contact plane in which the housing wedge side rests against the housing stop. In other words, the clamping wedge can be inserted along the contact surfaces of the housing stop into the filter housing. The joining direction can be embodied parallel to the housing-facing first bearing surface and/or the housing-facing second bearing surface.

The first bearing surface and/or the second bearing surface of the filter element wedge side each are positioned at a wedge base angle relative to the joining direction. The wedge base angle amounts to respectively 1° to 20°, in particular 1° to 10°, in particular 1.5° to 5°. By means of the wedge base angles, the force expenditure for clamping and/or detaching the filter element can be predetermined.

The housing-facing first bearing surface is separated from the housing-facing second bearing surface by a step. The filter element-facing first bearing surface is separated from the filter element-facing second bearing surface by a further step. The first and the second bearing surfaces can be spaced apart from each other by the respective step in joining direction and/or in clamping direction. The housing-facing step of the housing wedge side is offset relative to the filter element-facing step of the filter element wedge side in the joining direction.

The filter according to the invention comprises thus a clamping wedge whose bearing surfaces at two sides are embodied at the predetermined wedge base angle relative to each other. In other words, the clamping wedge comprises no parallel first bearing surfaces and no parallel second bearing surfaces. The stroke which has to be applied for pressing on the filter element can thus be realized uniformly distributed across the insertion path of the clamping wedge in joining direction. The insertion forces and release forces of the clamping wedge which are to be applied maximally can be reduced in this way. As a result, the particularly simple, in particular force expenditure-relieved, exchange of the filter element can be realized through the lateral service opening. Furthermore, a faulty assembly of the clamping wedge can be effectively prevented by means of the offset steps. In this way, the exchange of the filter element can be realized even more easily.

A joining direction is to be understood as a mounting direction of the clamping wedge in which the clamping wedge is inserted into the filter housing. A clamping direction is to be understood as an action direction of the clamping force effected by the clamping wedge with which the filter element is clamped at the filter housing.

The clamping wedge comprises wedge base angles. The wedge base angles each are embodied between the first bearing surface and/or the second bearing surface of the filter element wedge side and the joining direction. In other words, the wedge sides are oriented at a slant relative to each other. The wedge sides are preferably to be understood as the sections which are formed by the effective stop surfaces of the clamping wedge at the housing stop and the filter element stop.

The clamping wedge is preferably adapted to the measurement of the filter element in joining direction. Preferably, the clamping wedge comprises at least the measurement of the filter element in joining direction. In this way, a stroke to be effected can be distributed particularly uniformly on the insertion path of the clamping wedge.

The measurement of the clamping wedge and/or of the filter element can amount to 100 millimeters or more in the joining direction. Preferably, the measurement of the clamping wedge and/or of the filter element in joining direction amounts to 150 millimeters or more. Particularly preferred, the measurement of the clamping wedge and/or of the filter element in joining direction amount/amounts to 200 millimeters or more. In this way, a sufficiently large receiving region for a filter medium body for filtering the gaseous fluid can be made available.

The wedge base angles are adapted preferably to the pressing force which must be applied to the filter element. For this purpose, it can be provided that the wedge base angles are adapted to a mounting clearance or a mounting play of the filter element to be overcome and a required compression of an employed seal means. The required stroke for this purpose can be divided into a clearance stroke and into a compression stroke.

The clamping wedge is preferably embodied for effecting the required compression stroke. The clamping wedge can be configured for effecting a compression stroke between 1 millimeter and 6 millimeters, preferably between 2 millimeters and 5 millimeters. In this way, a high sealing action can be effected while providing a mounting space which is nonetheless kept at a minimum.

Alternatively or additionally, the clamping wedge can be embodied for effecting the clearance stroke. The clearance stroke amounts to preferably 2 millimeters or more. Particularly preferred, the clearance stroke amounts to 4 millimeters or more. In this way, a particularly easy insertion of the filter element can be enabled.

The seal means can be configured to be elastic. Preferably, the seal means comprises polyurethane and/or styrene as material, in particular a styrene block copolymer based on SEBS (styrene ethylene butylene styrene). In particular, the seal means can be comprised of polyurethane and/or styrene. In this way, a sealing action can be realized particularly reliably.

The filter comprises at least one filter element. Furthermore, it can be provided that the filter comprises a plurality of filter elements. The plurality of filter elements can be arranged for serial flow therethrough in the filter housing. Preferably, the plurality of filter elements are configured for arrangement so as to be at least fastened, in particular clamped, with the clamping wedge in the filter housing. In this way, the attachment of the filter element can be realized particularly quickly by means of said one clamping wedge. Particularly preferred, the plurality of filter elements are insertable through the service opening one after another into the filter housing. In this way, the service opening can be kept small with respect to its measurements.

In case of a plurality of filter elements, the clamping wedge can be arranged or embodied at a frame of a filter element. Furthermore, the clamping wedge can be configured for receiving a filter element. In this way, the number of individual components can be further reduced and mounting can be simplified.

In a preferred embodiment of the filter, the wedge base angle of the filter element-facing first bearing surface relative to the joining direction is identical to the wedge base angle of the filter element-facing second bearing surface relative to the joining direction. In other words, the wedge sides can be embodied with the same slant relative to the joining direction, whereby the insertion of the clamping wedge can be facilitated.

An embodiment of the filter is preferred in which the first bearing surface of the housing wedge side is embodied parallel to the second bearing surface of the housing wedge side. In this way, a uniform lifting and clamping of the filter element by means of the measurement of the clamping wedge in joining direction can be realized.

In a preferred embodiment of the filter, the first bearing surface and the second bearing surface of the filter element wedge side can extend parallel to the seal surface. In this way, a particularly uniform pressing of the filter element against the filter housing can be realized. This embodiment can be described also as an asymmetric embodiment wherein the advantage resides in a particularly uniform introduction of the clamping forces from the clamping wedge into the filter element because the operational contact is realized exactly in the direction of the normal relative to the seal surface. Furthermore, the wedge base angle which is required for reaching a predetermined compression stroke can thereby be selected larger which contributes to the mounting/demounting forces tending to be lower.

According to an alternative embodiment, the first bearing surface and/or the second bearing surface of the filter element wedge side can be positioned relative to the seal surface at an angle between 0.5° and 10°, in particular 0.5° to 5°, preferably between 0.75° and 2.5°. Preferably, the wedge base angle amounts to twice the angle between the first bearing surface and/or the second bearing surface of the filter element wedge side relative to the seal surface. This embodiment can also be referred to as symmetric embodiment and provides the advantage that the wedge base angle essentially is divided between the filter element wedge side and the housing wedge side so that the respective "part" of the wedge base angle required for reaching a predetermined compression stroke can be selected smaller which contributes to a self-locking action of the clamping wedge tending to be improved.

In a preferred further embodiment of the filter, it is provided that the second bearing surface of the filter element wedge side is spaced apart farther from the seal surface than the first bearing surface of the filter element wedge side. This enables the stepped configuration of the filter element wedge side while keeping a uniformly distributed force application at a high level across the insertion path of the clamping wedge.

In a preferred embodiment of the filter, the seal surface is formed at a seal means. The seal means comprises preferably a seal reaction force which

- amounts to between 0.003 and 0.023 Newton per millimeter seal line at a compression of 1 mm, and/or
- amounts to between 0.005 and 0.068 Newton per millimeter seal line at a compression of 2 mm, and/or
- amounts to between 0.013 and 0.133 Newton per millimeter seal line at a compression of 3 mm, and/or
- amounts to between 0.027 and 0.252 Newton per millimeter seal line at a compression of 4 mm, and/or
- amounts to between 0.049 and 0.415 Newton per millimeter seal line at a compression of 5 mm, and/or
- amounts to between 0.092 and 0.639 Newton per millimeter seal line at a compression of 6 mm, and/or
- amounts to between 0.160 and 1.296 Newton per millimeter seal line at a compression of 7 mm.

In a particularly preferred embodiment, the seal means comprises a seal reaction force which

- amounts to 0.013±20% Newton per millimeter seal line at a compression of 1 mm, and/or
- amounts to 0.019±20% Newton per millimeter seal line at a compression of 2 mm, and/or
- amounts to 0.054±20% Newton per millimeter seal line at a compression of 3 mm, and/or
- amounts to 0.109±20% Newton per millimeter seal line at a compression of 4 mm, and/or
- amounts to 0.183±20% Newton per millimeter seal line at a compression of 5 mm, and/or
- amounts to 0.290±20% Newton per millimeter seal line at a compression of 6 mm, and/or
- amounts to 0.505±20% Newton per millimeter seal line at a compression of 7 mm.

The seal reaction force, which is set forth in the unit Newton per millimeter seal line, represents a measure for the seal stiffness. In other words, the seal stiffness is a parameter for the force required for the compression of 1 millimeter seal line at a predetermined compression stroke. The seal stiffness can be divided into a material-caused seal stiffness and a geometrically caused seal stiffness.

Seal stiffness values in the parameter range proposed according to the invention are particularly advantageous for the function of the filter according to the invention because thereby mounting and demounting forces of the clamping wedge can be kept within an acceptable range, in particular such that the clamping wedge can be mounted and demounted with typical manual forces without problem. Typical manual forces can be in the range of maximally 70 N to 150 N. The parameter ranges of the seal stiffness values proposed herein differ significantly from the seals for air filters known from the prior art, in particular PUR seals, particularly by at least a factor 10, preferably by at least a factor 20.

A preferred further embodiment of the filter provides that the seal means comprises at least one seal lip. Preferably, the seal means comprises more than one seal lip, in particular three seal lips. Seal lips can be used for structural elastic contact at components to be sealed. Seal means with seal lips can therefore have a geometric seal stiffness that is less than the material-caused seal stiffness of the seal means. The use of seal means with seal lips can thus reduce the seal stiffness of the seal means required for an effective sealing action. In this way, the mounting and/or demounting force to be applied for the clamping wedge can be reduced and the repair and servicing can be simplified.

Preferably, the seal means is configured for a compression stroke between 1 millimeter and 6 millimeters, in particular between 2 millimeters and 5 millimeters. In this way, a good sealing action with a compression stroke as minimal as possible can be achieved.

An embodiment of the filter is preferred in which the filter element comprises a non-detachably arranged filter medium body. The filter medium body is in particular fastened to the filter element by gluing or the filter element is configured as a filter medium body molded over with plastic material. In this way, the number of individual parts can be reduced so that the exchange of the filter element can be realized even more easily.

Further preferred is an embodiment of the filter in which the filter element stop is embodied at a frame of the filter element. In this way, the filter element stop can be embodied particularly robust and facilitates a direct force introduction to the filter element by the clamping wedge.

In a preferred embodiment of the filter, the filter element stop comprises at least two stop projections which are embodied for contacting the first bearing surface and/or the second bearing surface of the filter element wedge side. Preferably, the stop projections are configured rib-shaped. In this way, the clamping wedge can realize a point contact at the filter element stop, whereby the friction forces can be reduced. This simplifies the insertion and removal of the clamping wedge.

In a preferred further embodiment of the filter, the at least two, in particular rib-shaped, stop projections each comprise a different projection height opposite to the joining direction. Preferably, the projection height is matched to the contour of the filter element wedge side of the clamping wedge, wherein the stop projections of the same projection height come to rest only against the first or the second bearing surface of the filter element wedge side. In this way, the material use for forming the filter element stops can be reduced so that the filter can be manufactured to be lighter. In addition, the mold removability of the filter element stop can be improved, whereby the manufacture of the filter can be simplified.

In addition, a further embodiment of the filter is preferred in which the filter element stop comprises a plurality of, in particular rib-shaped, stop projections. In this way, the maximum load of the stop projections can be reduced. Preferably, neighboring stop projections are spaced apart equidistantly in joining direction. In other words, the stop projections have the same spacing to their respective neighboring stop projections. In this way, pressing on the filter element can be realized particularly uniformly.

In a preferred embodiment of the filter, the clamping wedge comprises two wedge flanks and a wedge stay that connects the wedge flanks. The two wedge flanks are preferably arranged on oppositely positioned sides of the filter element. In other words, the clamping wedge engages around the filter element circumferentially or can contact three sides of a frame of the filter element. In this way, insertion of the clamping wedge and thus clamping of the filter element can be realized particularly reliably in regard to mounting.

Further preferred is an embodiment of the filter in which the filter comprises a wedge guide for lateral guiding of the clamping wedge in the joining direction. The wedge guide engages at least parts of the clamping wedge at least partially. Preferably, the wedge guide engages around at least one wedge flank. The wedge guide can be configured opposite to the clamping direction. In this way, a freedom of movement of the clamping wedge can be limited to the joining direction and the clamping direction. In other words, positioning of the clamping wedge upon insertion can be simplified.

In a preferred further embodiment of the filter, the wedge guide is configured at the housing stop and/or at the filter element stop. Preferably, the wedge guide is formed at two oppositely positioned sides of the filter element and/or of the filter housing. In this way, a particularly safe guiding action can be enabled.

In a preferred embodiment of the filter, a positioning projection extending in clamping direction is embodied at the filter element stop. In other words, the positioning projection is embodied so as to extend parallel to the clamping direction. The positioning projection can be configured for contacting the housing stop during insertion of the filter element and for pre-positioning the filter element in the clamping direction. In other words, the filter element upon insertion can be moved already in the clamping direction. In this way, the clearance stroke can be realized by the filter element. The clamping wedge subsequently can be inserted with reduced force expenditure into the filter housing.

A further embodiment of the filter is preferred in which the clamping wedge comprises at least one securing element, in particular a snap hook. The securing element is preferably arranged or embodied at the wedge stay. The securing element effects preferably for completely inserted clamping wedge a fixation of the clamping wedge in this position. The filter housing comprises typically a complementary securing element, for example, an engagement cutout for a snap hook. In other words, the securing element is embodied for captive holding of the clamping wedge at the filter housing in the inserted state of the clamping wedge. In this way, an accidental removal of the clamping wedge can be prevented.

Preferred is furthermore an embodiment of the filter in which the housing stop and the clamping wedge comprise parallel reinforcement ribs embodied in clamping direction, wherein the reinforcement ribs of the clamping wedge and the reinforcement ribs of the housing stop are preferably aligned in clamping direction in an inserted state of the clamping wedge. In this way, a bearing force which is directed opposite to the clamping force can be transferred particularly well to the filter housing.

The underlying object is further solved by a clamping wedge for clamping a filter element within a filter. The clamping wedge can be a clamping wedge described above and in the following. The filter can be a filter described above and in the following. In the state mounted at the filter, the clamping wedge comprises a housing wedge side facing the housing stop and a filter element wedge side facing the filter element stop. The housing wedge side and the filter element wedge side each comprise a first bearing surface and a second bearing surface separated by a step. The first bearing surface and/or the second bearing surface of the housing wedge side are embodied in or parallel to a joining direction of the clamping wedge. The first bearing surface of the filter element wedge side and/or the second bearing surface of the filter element wedge side each are positioned relative to the joining direction at a wedge base angle which amounts to 1° to 20°, in particular 1° to 10°, in particular 1.5° to 5°. The at least one step of the housing wedge side is offset relative to the at least one step of the filter element wedge side in joining direction.

The underlying object is further solved by a filter element for arrangement in a filter as described above with a clamping wedge as described above. The filter element comprises a seal surface and a filter element stop. The seal surface is resting in a mounted state of the filter element sufficiently gas-tightly against a filter housing of the filter. The filter element comprises the filter element stop at a side which is facing away from the seal surface. Preferably, the filter element stop is embodied at the filter element. The filter element stop comprises a first filter element stop section which is embodied for contact of the filter element-facing first bearing surface of the clamping wedge. In addition, the filter element stop comprises a second filter element stop section which is provided for contact of the filter element-facing second bearing surface of the clamping wedge. The first filter element stop section and the second filter element stop section are arranged offset relative to each other in joining direction so that the step of the filter element wedge side of the clamping wedge can be received therebetween. The first filter element stop section and/or the second filter element stop section each are positioned relative to the joining direction at a stop section base angle which amounts to 1° to 20°, in particular 1° to 10°, in particular 1.5° to 5°.

The features and feature combinations disclosed herein in relation to the filter according to the invention as well as its specific advantages can be applied to the filter element according to the invention and vice versa.

In a preferred embodiment of the filter element, it comprises at least one positioning projection for pre-positioning the filter element in clamping direction during insertion of the filter element into the filter housing.

BRIEF DESCRIPTION OF THE DRAWINGS

Further features and advantages of the invention result from the following detailed description of embodiments of the invention, from the claims as well as with the aid of the figures of the drawing, showing details according to the invention. The aforementioned and still to be explained features can be realized each individually by themselves or several thereof in any expedient combinations in variants of the invention. The features illustrated in the drawing are illustrated such that the particularities according to the invention can be made clearly visible.

DESCRIPTION OF PREFERRED EMBODIMENTS

Figure 1:
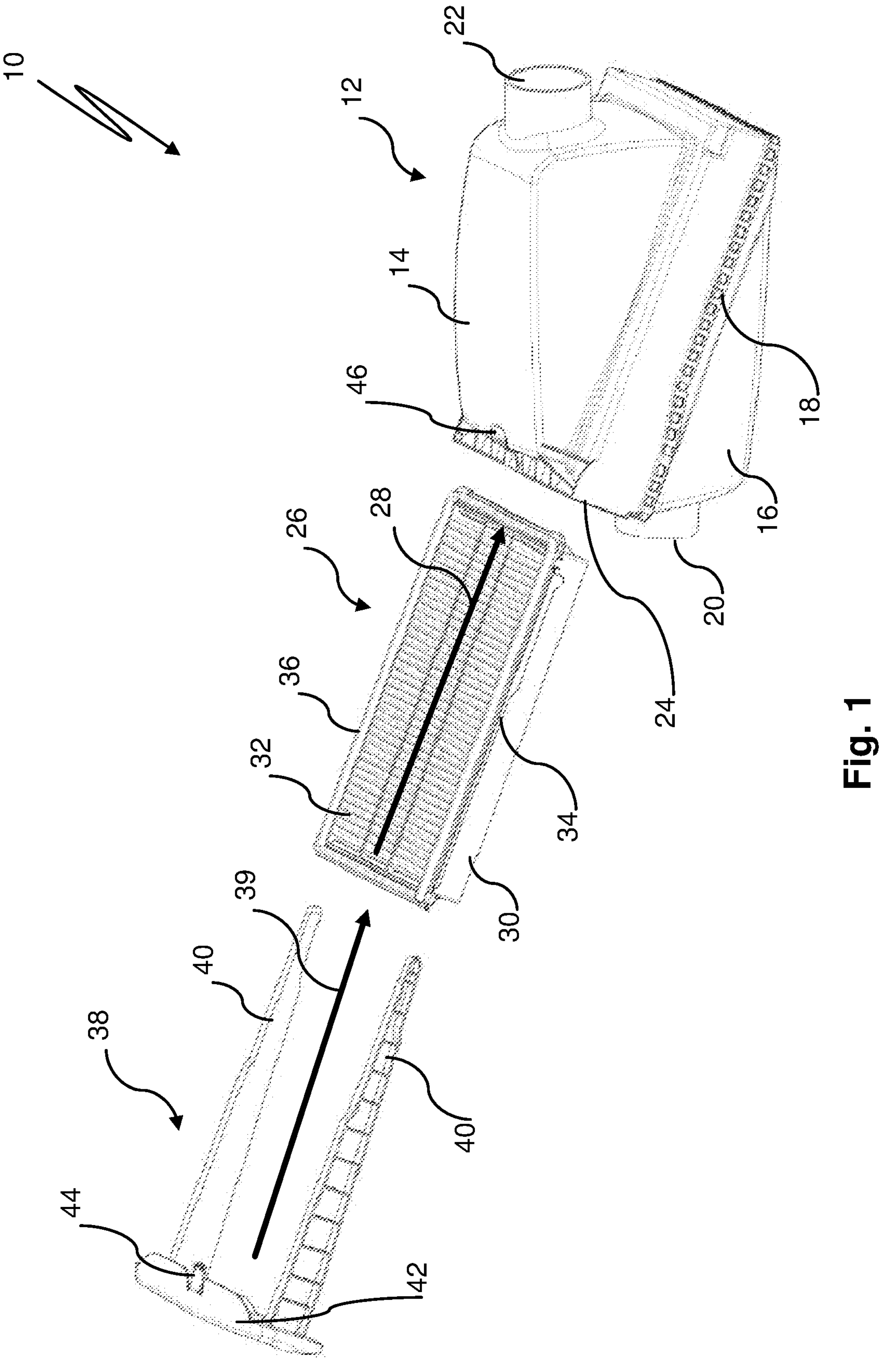
FIG. 1 shows a filter according to the invention for filtering gaseous fluid in a non-mounted state with a first embodiment of a filter element and a clamping wedge.

FIG. 1 shows a filter 10 for filtering gaseous fluids, in particular air. The filter 10 according to the illustration in FIG. 1 is illustrated in a non-mounted state. The filter 10 comprises a filter housing 12. The filter housing 12 can be of a multi-part configuration and in particular comprise a top shell 14 and a bottom shell 16. The top shell 14 and the bottom shell 16 can be detachably fastened to each other by locking elements 18, as illustrated. For reasons of clarity, only one locking element 18 is provided with a reference character.

The filter 10 comprises a raw-side inlet opening 20 and a clean-side outlet opening 22. According to the illustration, the inlet opening 20 is embodied at the bottom shell 16 and the outlet opening 22 at the top shell 14. The filter 10 comprises in addition a service opening 24 that is embodied at the top shell 14 above the inlet opening 20.

Through the service opening 24, a filter element 26 can be inserted into the filter housing 12 or removed from the filter housing 12. In this context, the filter element 26 is preferably inserted in a longitudinal direction 28 into the filter housing 12. Preferably, the filter element 26 can be inserted like a drawer into the filter housing 12. In this way, positioning of the filter element 26 can be realized particularly easily.

The filter element 26 can comprise a frame 30 and a filter medium body 32. The filter medium body 32 can be arranged in the frame 30. Preferably, the filter medium body 32 is fastened to the frame 30. In a particularly preferred embodiment, the filter medium body 32 is arranged non-detachably at the frame 30. The filter element 26 can be embodied, for example, as a plastic over-molded filter medium body 32. Furthermore, the filter medium body 32 can be glued into the frame 30, for example, wherein the frame 30 is preferably comprised of a bending-resistant plastic material, in particular a hard plastic material. Such filter elements 26 exhibit a particularly high sealing action between filter medium body 32 and frame 30.

The filter element 26, as illustrated, can comprise a flange 34. The flange 34 is preferably arranged at the frame 30, particularly preferred formed thereat. In this way, the number of individual parts can be reduced, which simplifies the assembly of the filter 10.

The filter element 26 can comprise a seal means 36. The seal means 36 can serve for sealing the filter element 26 at the outflow side and is resting against the filter housing 12 in a mounted state of the filter 10. The seal means 36, as illustrated, can be arranged at the flange 34, in particular detachably.

After the filter element 26 has been inserted into the filter housing 12, a clamping wedge 38 can be inserted in a joining direction 39 into the filter housing 12 in addition to the filter element 26. The joining direction 39 can deviate from the longitudinal direction 28 of the filter element 26. In other words, the filter element 26 can comprise an insertion and/or removal direction deviating relative to the clamping wedge 38. The clamping wedge 38 comprises in the illustrated embodiment two wedge flanks 40 which are connected to each other by a wedge stay 42. The clamping wedge 38 can engage circumferentially partially around the filter element 26 in the mounted state. The wedge flanks 40 in this context can be arranged at oppositely positioned sides of the filter element 26.

In addition, the clamping wedge 38 can comprise a securing element 44—here in the form of a snap hook—which in a mounted state of the clamping wedge 38 engages in a corresponding securing cutout 46 at the filter housing 12. The clamping wedge 38 in this manner can be secured reliably in its mounted position in the filter housing 12.

Figure 2:
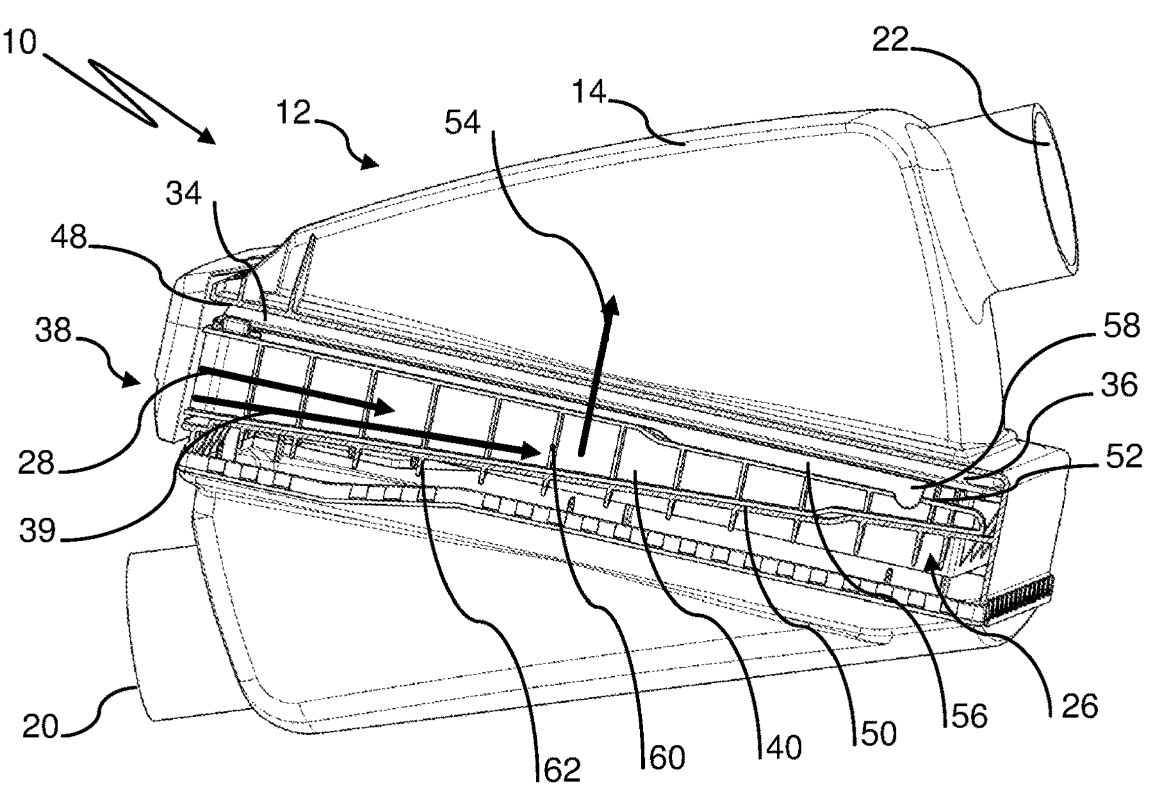
FIG. 2 shows the filter of FIG. 1 in a mounted state with the clamping wedge arranged between a filter housing of the filter and the filter element in a partially sectioned view.

FIG. 2 shows the filter 10 of FIG. 1 in a mounted state. The filter housing 12 is illustrated for illustrative explanation in a partially sectioned illustration.

In the illustrated state, the filter element 26 is arranged between the inlet opening 20 and the outlet opening 22. Unfiltered gases (not illustrated) can flow through the inlet opening 20 into the filter housing 12 in order to be subsequently filtered by the filter element 26 prior to leaving the filter housing 12 through the outlet opening 22. In order to prevent bypassing of the filter element 26, the filter element 26 is resting with the seal means 36 forming a seal surface 48 against the filter housing 12. The seal surface 48 extends typically parallel to the longitudinal direction 28 of the filter element 26 and/or transversely to the joining direction 39.

A uniform sealing effect is ensured in this context by the clamping wedge 38. The clamping wedge 38, as illustrated, is arranged between the filter housing 12—here the top shell 14—and the filter element 26. For contact of the clamping wedge 38, here the wedge flank 40, a housing stop 50 is arranged at the filter housing 12 and a filter element stop 52 at the filter element 26. Preferably, the housing stop 50 is embodied at the filter housing 12. Further preferred, the filter element stop 52 is embodied at the filter element, in particular at the flange 34.

Upon insertion of the clamping wedge 38, the latter is pushed in joining direction 39 along a contact surface of the housing stop 50 into the filter housing 12 between the housing stop 50 and the filter element stop 52. In this context, due to its measurement transverse to the joining direction 39, the clamping wedge 38 comprises a space demand which is greater than the space available between the housing stop and the filter element stop 52 in the loose state of the filter element 26. The clamping wedge 38 therefore first contacts with a partial section the filter element stop 52 and the housing stop 50. Upon further insertion of the clamping wedge 38, the clamping wedge 38 is supported at the housing stop 50 and lifts the filter element 26 in a clamping direction 54. In doing so, the filter element 26 is pressed in the clamping direction 54 with the seal surface 48 against the filter housing 12. In this context, it can be provided that the seal means 36 is at least partially compressed, whereby the sealing action can be increased.

The clamping direction 54 extend substantially transversely to the joining direction 39. The clamping direction 54 extends preferably in direction of the normal or perpendicularly to the seal surface 48. Further preferred, the clamping direction 54 extends in an angle range between 91° and 100°, particularly preferred between 91.5° and 95°, relative to the joining direction 39. In this way, a particularly uniform pressing of the filter element 26 against the filter housing 12 can be realized.

The filter element 26 comprises according to the illustrated embodiment a lateral wedge guide 56 embodied at the flange 34. The wedge guide 56, as illustrated, can form together with the flange 34 and the frame 30 a U-profile which engages around the clamping wedge 38 at least in sections. In this way, the clamping wedge 38 can be positioned particularly reliably at the filter element stop 52.

In addition, the filter element 26 can have a positioning projection 58. Preferably, the filter element 26 comprises the positioning projection 58 at the front in longitudinal direction 28. The positioning projection 58 can be arranged or embodied at the frame 30, at the flange 34 and/or, as illustrated, at the wedge guide 56. The positioning projection 58 can project with a projection height opposite to the clamping direction 54 past the filter element stop 52. In this way, upon insertion of the filter element 26, it can be effected that the positioning projection 58 contacts the housing stop 50 and, in this way, opens an insertion space for the clamping wedge 38 between housing stop 50 and filter element stop 52. In other words, the filter element 26 can be lifted by means of the positioning projection 58 in the clamping direction 54 upon insertion. In this way, the subsequent insertion of the clamping wedge 38 can be simplified. Advantageously, the positioning projection 58 can be designed as one piece together with the wedge guide 56 which, inter alia, increases the stiffness.

According to the illustrated embodiment of the filter 10, it can further be provided that the clamping wedge 38 comprises, in particular forms, reinforcement ribs 60. In addition, it can be provided that the housing stop 50 comprises, in particular forms, reinforcement ribs 62. The clamping wedge 38 and/or the housing stop 50 can comprise in particular a plurality of reinforcement ribs 60, 62. For reasons of clarity, only one reinforcement rib 60 and one reinforcement rib 62 is provided with a reference character. The reinforcement ribs 60 and/or the reinforcement ribs 62 can extend in the clamping direction 54. Particularly preferred, neighboring reinforcement ribs 60 and/or neighboring reinforcement ribs 62 are spaced apart equidistantly from each other. Particularly preferred, the reinforcement ribs 60 are aligned with the reinforcement ribs 62 in a mounted state of the clamping wedge 38. In this way, a force introduction can be realized particularly effectively.

Figure 3:
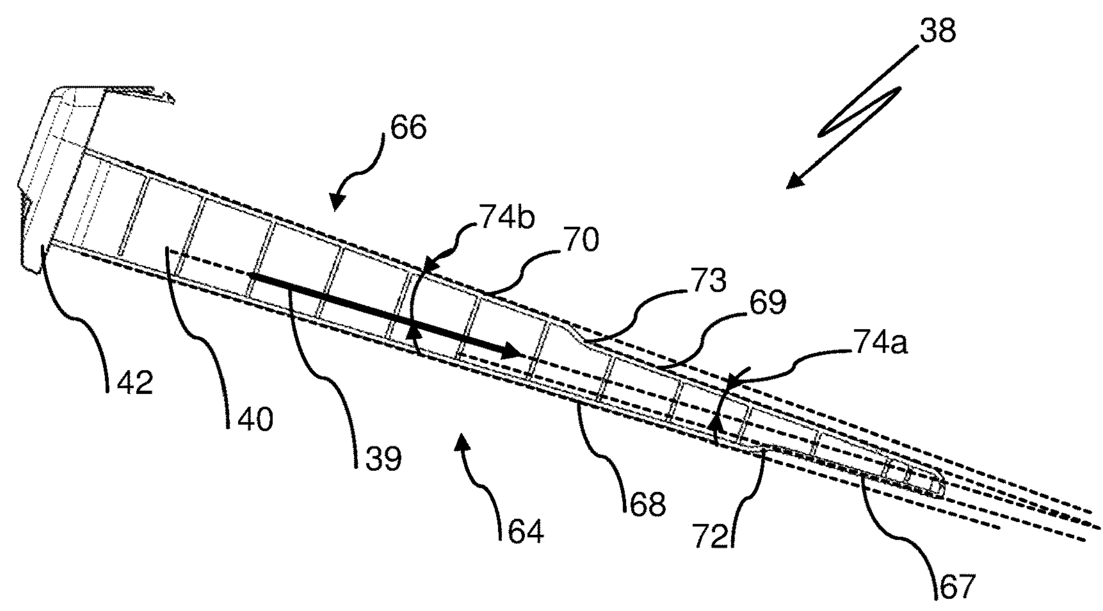
FIG. 3 shows the clamping wedge of the preceding Figures with a wedge flank and a wedge stay in a side view.

FIG. 3 shows the clamping wedge 38 of FIGS. 1, 2 in a side view of the wedge flank 40 and the wedge stay 42.

The clamping wedge 38 comprises a housing wedge side 64 facing the housing stop 50 (see FIG. 2) and a filter element wedge side 66 facing the filter element stop 52 (see FIG. 2). The housing wedge side 64 comprises a housing-facing first bearing surface 67 and a housing-facing second bearing surface 68. The filter element wedge side 66 comprises a filter element-facing first bearing surface 69 and a filter element-facing second bearing surface 70. In a mounted state of the clamping wedge 38, the first bearing surfaces 67, 69 and the second bearing surfaces 68, 70 are contacting at least partially the housing stop 50 or the filter element stop 52. During the insertion of the clamping wedge 38, the first bearing surfaces 67, 69 and/or second bearing surfaces 68, 70 are in sliding contact with the housing stop 50 or the filter element stop 52. The housing-facing first bearing surface 67 and the housing-facing second bearing surface 68 form a contact plane, respectively, together with the housing stop 50. The filter element-facing first bearing surface 69 and the filter element-facing second bearing surface 70 form a contact plane, respectively, together with the filter element stop 52.

The housing-facing first bearing surface 67 and the housing-facing second bearing surface 68 of the housing wedge side 64 are separated by a housing-facing step 72 and the filter element-facing first bearing surface 69 and the filter element-facing second bearing surface 70 of the filter element wedge side 66 are separated by a filter element-facing step 73. In other words, the housing wedge side 64 and the filter element wedge side 66 comprise an offset which, during the insertion of the clamping wedge 38 and in a mounted state of the clamping wedge 38, can have no contact with the housing stop 50 and/or the filter element stop 52.

The housing-facing step 72 of the housing wedge side 64 is offset relative to the filter element-facing step 73 of the filter element wedge side 66 in joining direction 39. In this way, prevention of upside-down insertion of the clamping wedge 38 into the filter housing 12 (see FIGS. 1, 2) can be enabled, whereby the mounting reliability can be improved.

The first bearing surface 67 of the housing wedge side 64 and/or the second bearing surface 68 of the housing wedge side 64 can extend parallel to the joining direction 39, as illustrated. The first bearing surface 69 of the filter element wedge side 66 is positioned relative to the joining direction 39 at a wedge base angle 74*a*. The second bearing surface 70 of the filter element wedge side 66 is positioned relative to the joining direction 39 at a wedge base angle 74*b*. The wedge base angles 74*a*, 74*b* can be identical, as illustrated. In other words, the first bearing surface 69 and the second bearing surface 70 of the filter element wedge side 66 can extend parallel to each other. According to the embodiment illustrated in FIG. 3, the first bearing surfaces 67, 69, the second bearing surfaces 68, 70, and the first bearing surfaces 67, 69 relative to the second bearing surfaces 68, 70 of the other wedge side 64, 66 are positioned at the same wedge base angle 74*a*, 74*b*, respectively. In this way, clamping of the filter element 26 can be realized distributed across a longer insertion path in joining direction 39 so that the insertion forces upon insertion of the clamping wedge 38 and/or the release forces for removal of the clamping wedge 38 can be reduced. This has a particularly advantageous effect in connection with sealing means 36, for example, PUR foam, which may have high reaction forces.

In a mounted state of the clamping wedge 38, the first bearing surface 69 and the second bearing surface 70 of the filter element wedge side 66 are embodied preferably parallel to the seal surface 48. In this state, the first bearing surface 69 is particularly preferred spaced apart farther from the seal surface 48 than the second bearing surface 70.

Figure 4:
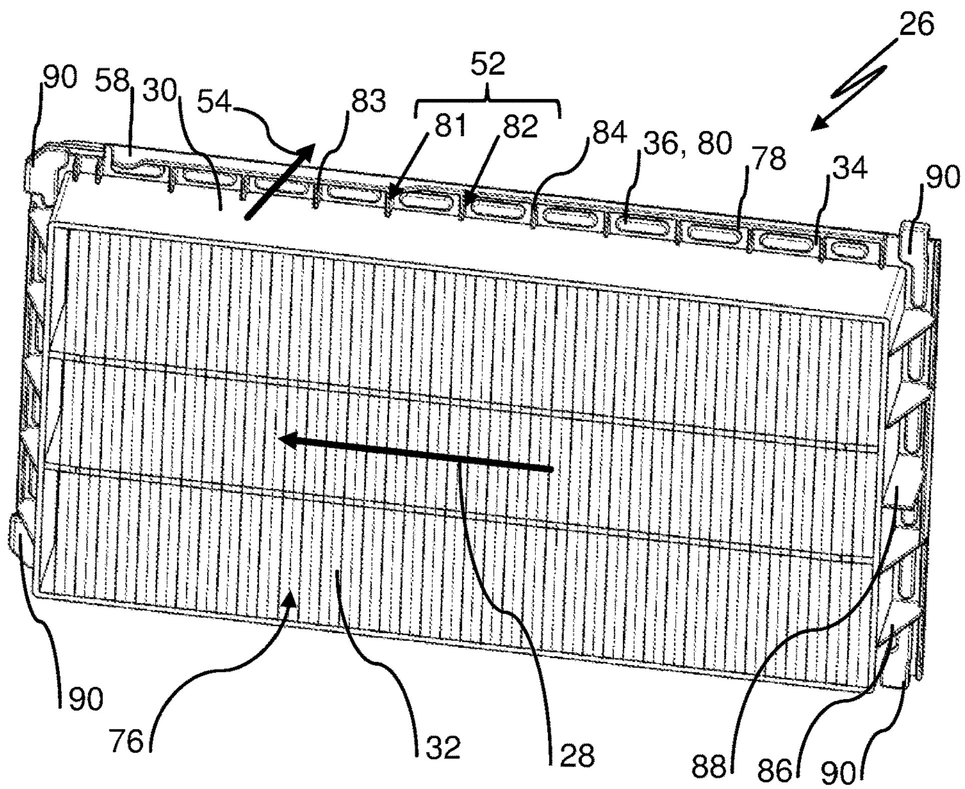
FIG. 4 shows the filter element of FIGS. 1, 2 in a perspective view of its inflow side.

FIG. 4 shows the filter element 26 of FIGS. 1, 2 in a perspective view of its inflow side 76.

The filter element 26 comprises the filter medium body 32. The filter medium body 32, as illustrated, can comprise a pleated or folded filter medium body 32.

According to the illustrated embodiment, the filter element 26 comprises the frame 30 with flange 34 formed thereat. The flange 34 projects laterally like a collar past the frame 30. In this way, the frame inner region of the frame 30 can be occupied completely by the filter medium body 32.

The flange 34 can comprise a plurality of fastening cutouts 78. The fastening cutouts 78 are formed preferably as through passages. The fastening cutouts 78 can be embodied for permanent arrangement of the seal means 36. Preferably, the seal means 36, as illustrated, comprises fastening knobs 80 passing through the fastening cutouts 78. In this way, a captive arrangement of the seal means 36 at the flange 34 can be realized and still a simple exchange of the seal means 36 can be ensured. For reasons of clarity, only one fastening cutout 78 and one fastening knob 80 is provided with a reference character.

According to the shown illustration, the filter element stop 52 comprises a first filter element stop section 81 and a second filter element stop section 82. The first filter element stop section 81 and the second filter element stop section 82 are arranged at the side of the filter element 26 facing away from the seal surface 48 (see FIG. 2). The filter element stop 52 or the filter element stop sections 81, 82 can have a plurality of stop projections 83, 84. In other words, the filter element stop sections 81, 82 or the filter element stop 52 are formed by the stop projections 83, 84. The stop projections 83 comprise a reduced projection height opposite to the clamping direction 54 relative to the stop projections 84 starting at the flange 34. This enables the adaptation of the filter element stop 52 to the filter element wedge side 66 (see FIG. 3) of the clamping wedge 38 (see FIGS. 1 to 3). In an embodiment, not illustrated, the filter element stop sections 81, 82 can also form continuous surfaces.

Furthermore, by contact of the clamping wedge 38 (see FIGS. 1 to 3) at the stop projections 83, 84 of the filter element housing stop 52, a point contact can be realized, whereby the insertion and removal of the clamping wedge 38 can be simplified.

The filter element 26 can comprise a plurality of reinforcement ribs 86 which support the flange 34 relative to the frame 30. The reinforcement ribs 86 are preferably arranged or formed exclusively at the sides of the frame 30 oriented orthogonally to the longitudinal direction 28. In this way, the insertion of the clamping wedge 38 can be realized without impairment by the reinforcement ribs 86. The reinforcement ribs 86 are typically embodied of a triangular shape. In a particularly preferred embodiment, the filter element 26 can comprise a mounting rib 88 for pre-positioning of the filter element 26 inside of the filter housing 12 (see FIGS. 1, 2). The mounting rib 88 is preferably arranged or embodied at the filter element 26 in the longitudinal direction 28 to the rear. In this way, the mounting rib 88 with completely inserted filter element 26 can rest on the filter housing 12 and effect a movement of the filter element 26 in clamping direction 54 (see FIG. 5). A pre-positioning of the filter element 26 can be realized in this context particularly advantageously by combination of the mounting rib 88 with the positioning projection 58. In particular, for arrangement of the positioning projection 58 in longitudinal direction 28 at the front at the filter element 26, a particularly uniform lifting of the filter element 26 can be realized in this way.

The filter element 26 can additionally comprise various buffer elements 90. The buffer elements 90 are preferably arranged or embodied at the flange 34. Further preferred, the buffer elements 90 project laterally past the flange 34. Particularly preferred, the buffer elements 90 are formed of an elastic material. In a mounted state of the filter 10 (see FIGS. 1, 2), the buffer elements 90 can rest against the filter housing 12. In this way, acoustic disturbance noises, for example, rattling, can be prevented. In addition, the buffer elements 90 can comprise a centering function upon insertion of the filter element 26 into the filter housing 12. In this way, the filter element 26 can be positioned particularly precisely in a transverse direction so that the insertion of the clamping wedge 38 is simplified.

Figure 5:
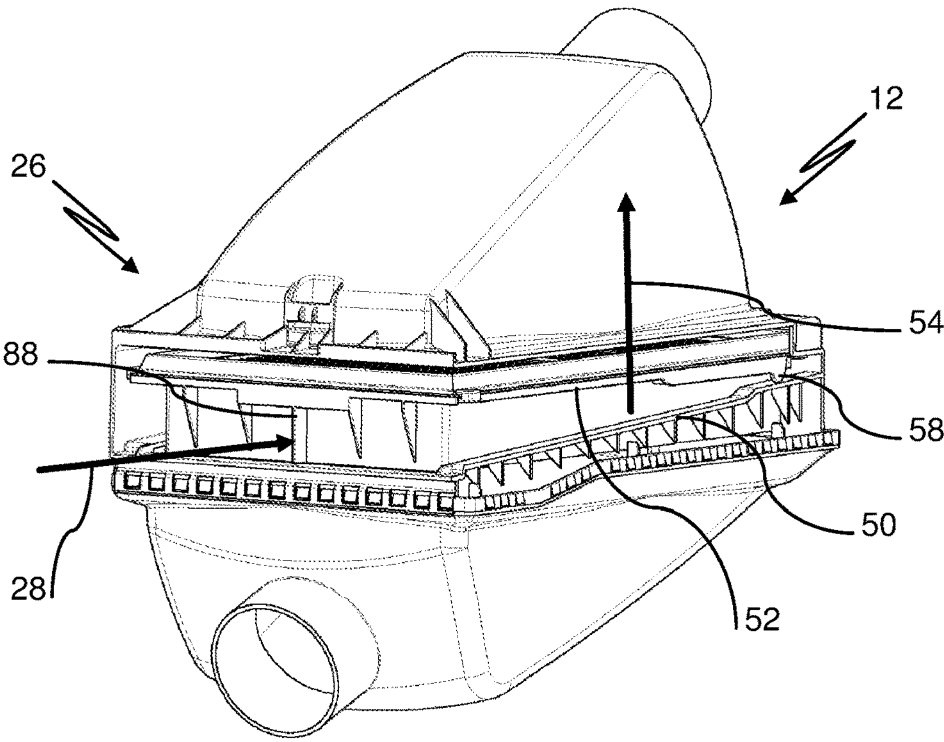
FIG. 5 shows the filter housing with a filter element inserted therein in a pre-mounted state.

FIG. 5 shows the filter housing 12 with a filter element 26 inserted therein without the clamping wedge 38 (see FIGS. 1-3). The filter element 26 is located in a pre-positioned position within the filter housing 12. In other words, the filter element 26 has been inserted in longitudinal direction 28 into the filter housing 12. During joining, the positioning projections 58, which are here provided on the filter element 26 at both sides, come into contact with the housing stop 50 of the filter housing 12. In this way, a movement or lifting of the filter element 26 is effected in the environment of the positioning projections 58 in clamping direction 54. In an analog manner, the mounting rib 88, for completely inserted filter element 26, effects in the environment of the mounting rib 88 a movement or lifting of the filter element 26 in clamping direction 54. In this way, the filter element 26 as a whole is pre-positioned in clamping direction 54 and the insertion of the clamping wedge 38 into the intermediate space between the filter element stop 52 and the housing stop 50 is facilitated.

Figure 6:
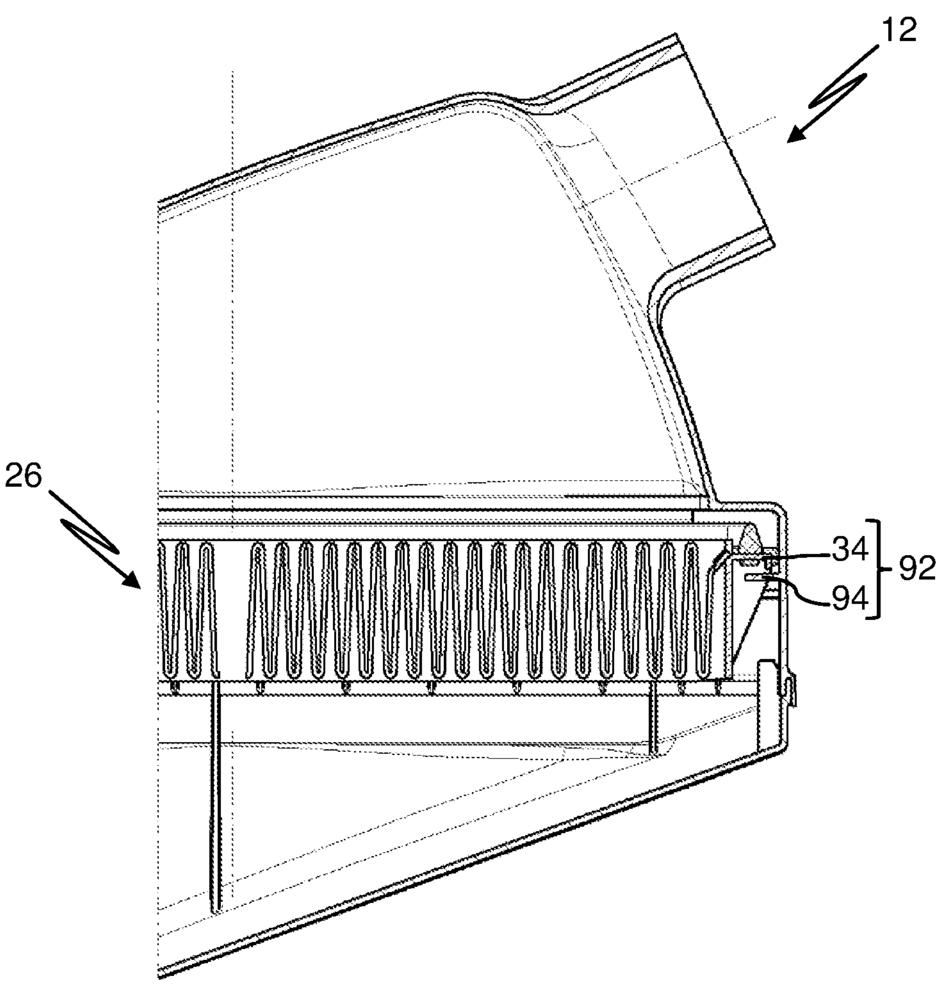
FIG. 6 shows the filter housing with filter element inserted therein of FIG. 5 in a partially sectioned illustration.

FIG. 6 shows a detail of FIG. 5 of the filter element 26 inserted into the filter housing 12. The filter housing 12 comprises in connection with the filter element 26 a securing action 92 against faulty assembly. The securing action 92 against faulty assembly according to the illustrated embodiment is embodied in the form of a housing-facing securing projection 94 which engages from below the flange 34 of the filter element 26 in a pre-mounted state. Engagement from below of the securing projection 94 can be realized upon joining of the filter element 26 only when the filter element 26 is lifted by the positioning projections 58 (see FIG. 5). When such a lifting of the filter element 26 is not realized, for example, because the positioning projections 58 are missing, the flange 34 is pushed below the securing projection 94 upon joining of the filter element 26. As a result of this, the clamping wedge 38 (see FIGS. 1-3) cannot be completely inserted into the filter housing 12 and clamping of the filter element 26 against the filter housing 12 cannot be realized.

Figure 7:
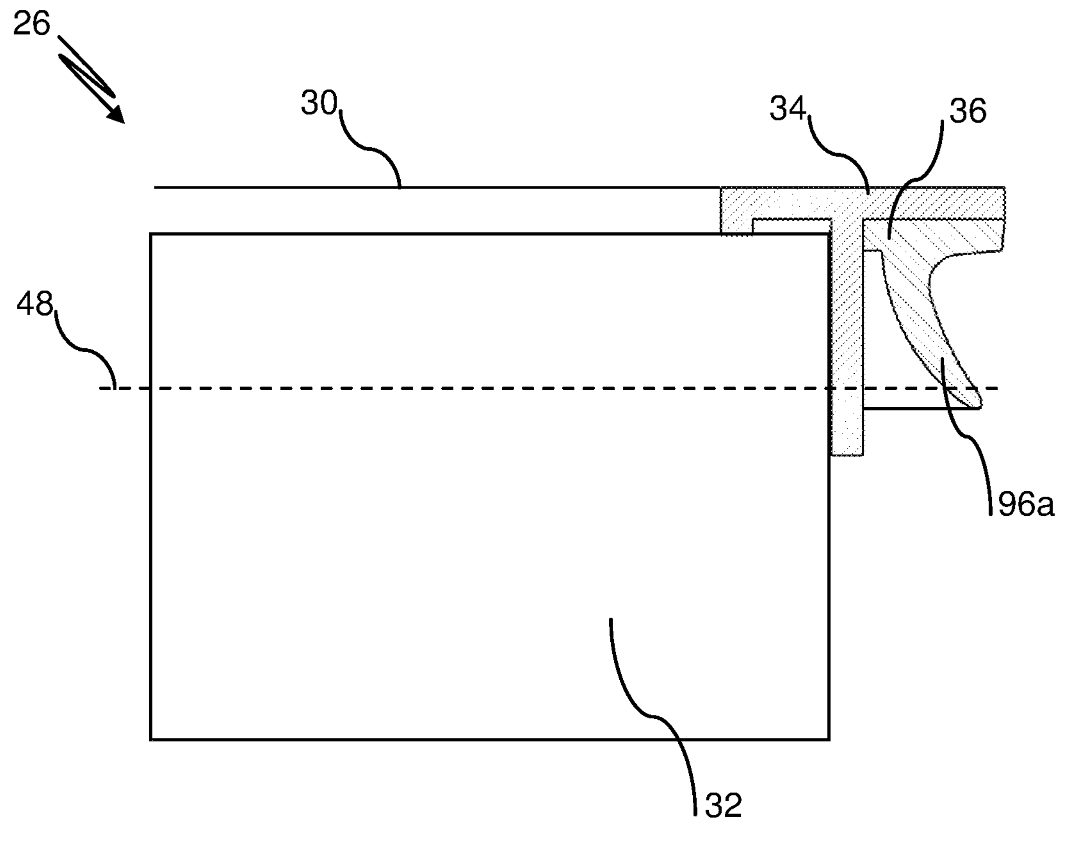
FIG. 7 shows a second embodiment of a filter element with a seal means comprising a seal lip.

FIG. 7 shows a sectioned partial detail of a filter element 26 according to a second embodiment in a schematic illustration.

The filter element 26 comprises the filter medium body 32 which is surrounded by the frame 30 circumferentially. The frame 30 can be arranged at the filter medium body 32 preferably so as to be non-detachable. The frame 30 comprises the flange 34.

In addition, the filter element 26 comprises a seal means 36 arranged at the flange 34. The seal means 36 surrounds the filter medium body 32 and the frame 30 circumferentially.

The seal means 36, as illustrated, can comprise at least one seal lip 96*a*. By the use of a seal means 36 with a seal lip 96*a*, the seal stiffness of the seal means 36 can be reduced. In this way, the forces for mounting and/or demounting of the clamping wedge 38 which are required for the gas-tight pressing on of the filter element 26 (see FIG. 2) at the seal surface 48 can be lowered. In this way, the manufacture and service of the filter 10 (see FIG. 1) can be facilitated. The seal lip 96*a* surrounds the filter element 26 preferably circumferentially.

Figure 8:
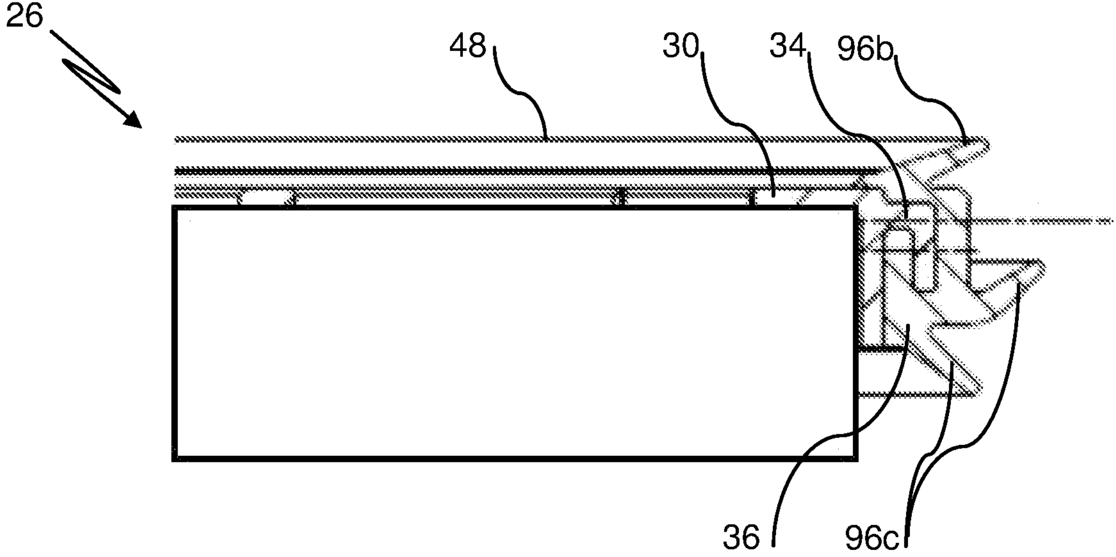
FIG. 8 shows a third embodiment of a filter element with a seal means comprising a plurality of seal lips.

FIG. 8 shows a sectioned partial detail of the filter element 26 according to a third embodiment in a schematic illustration.

The filter element 26 comprises a frame 30 with a flange 34 embodied thereat. The flange 34 is embodied in a collar shape in order to simplify the arrangement of the seal means 36. In other words, the seal means 36 can be captively and gas-tightly arranged between flange 34 and frame 30.

The seal means 36 comprises according to the embodiment a plurality of—here three—seal lips 96*b*, 96*c*. The seal lip 96*b* forms according to the illustrated embodiment the seal surface 48 with which the filter element 26 can be pushed against the filter housing 12 (see FIGS. 1, 2). The seal lips 96*c* can effect a further sealing action of the filter element 26 in circumferential direction.

Figure 9:
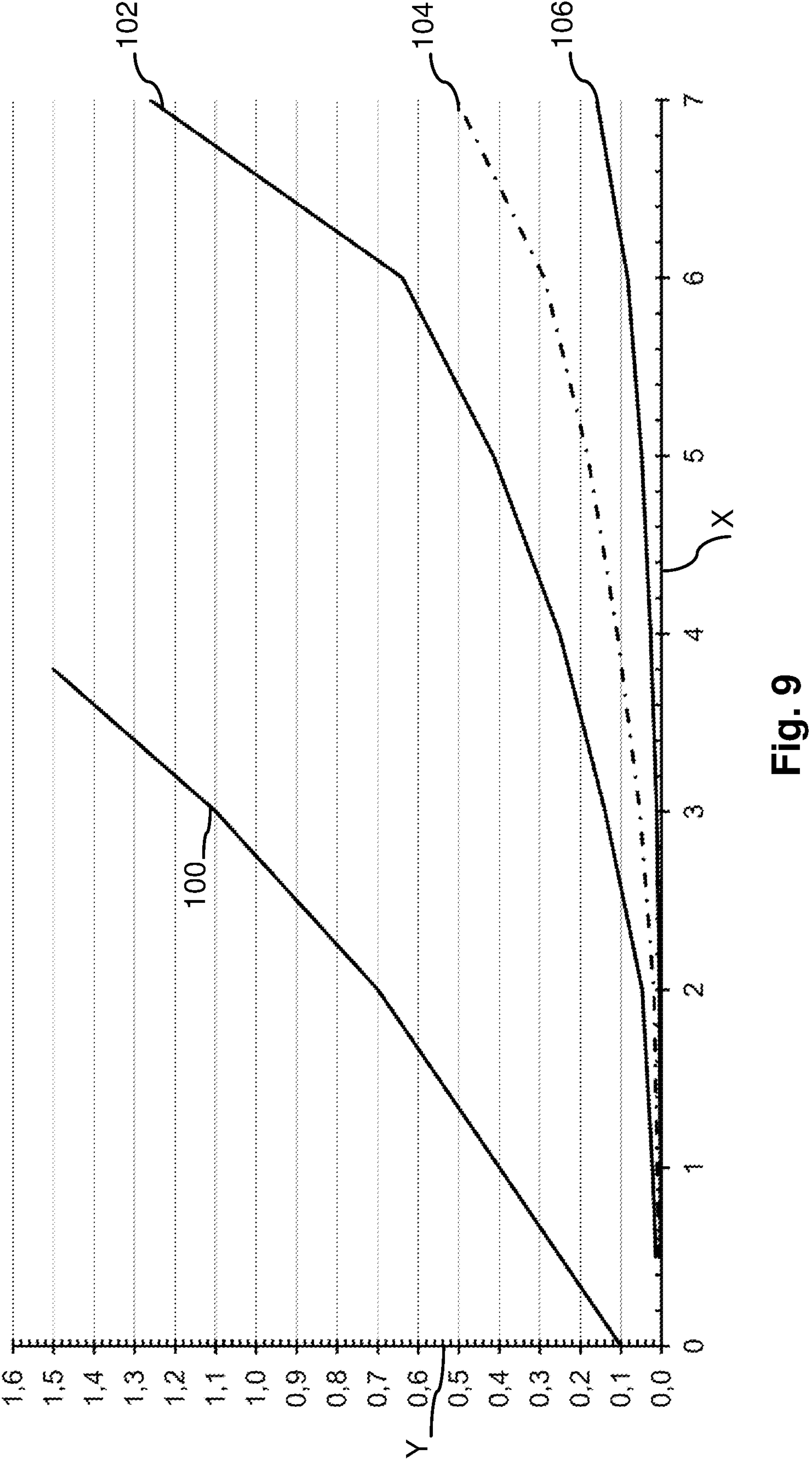
FIG. 9 shows a diagram showing seal reaction forces of seal means usable in the filter according to the invention as well as seal reaction forces of a seal means of a filter of the prior art.

In FIG. 9, a diagram is illustrated which shows seal reaction forces of seal means 36 (see FIGS. 1, 2, 7, 8) useable in the filter elements 26 according to the invention as well as seal reaction forces of a seal means of a filter element of the prior art.

The diagram illustrates a compression of the seal means 36 plotted on an X axis in millimeters (mm). Furthermore, the diagram illustrates plotted on the Y axis the seal reaction forces in Newton per millimeter seal line (N/mm). In other words, the diagram illustrates the seal reaction forces occurring at one millimeter seal line upon pressing or compression of the respective seal means 36.

The typical seal reaction forces of a seal means known from the prior art, in particular of a solid cross section seal means, of PUR are illustrated by a characteristic line 100. The seal means of the prior art upon minimal compression can have a sudden increase of seal reaction force and increase primarily proportionally with increasing compression. For conventional seal means 36, the seal reaction forces can amount to 1.5 Newton per millimeter seal line at a compression of 3.8 millimeters, as illustrated.

In contrast thereto, the seal means 36 for a filter element suitable for use with the invention can have seal reaction forces as characterized by the characteristic lines 102, 104, 106. Preferably, the seal means 36 has a seal reaction force which is lying between the top characteristic line 102 and the bottom characteristic line 106. Further preferred, the seal means 36 comprises seal reaction forces which upon compression of the seal means 36 extend between the top characteristic line 102 and the bottom characteristic line 106. Particularly preferred, the seal means 36 comprises seal reaction forces along the characteristic line 104 with a tolerance of +/−20%. The course of the seal reaction forces can extend progressively, as illustrated.

The seal means 36, as illustrated, can exhibit seal reaction forces which, for same compression of the seal means 36, are significantly lower than the seal reaction forces of the seal means known from the prior art. In this way, the force expenditure for gas-tight mounting and demounting of the filter element 26 (see FIGS. 1, 2, 4, 5) can be reduced. In particular, it is enabled in this way that the clamping wedge 38 can be mounted and demounted with typical manual forces of 70 N to 150 N. For higher seal reaction forces than illustrated in the characteristic line 102, there is the risk that the clamping wedge can no longer be manually moved because immense friction forces in operational contact of the clamping wedge at the filter element as well as the housing lead to wedge blocking. Thus, the features in regard to the structural configuration of the clamping wedge and the features in regard to the seal reaction forces of the seal means supplement each other and produce a combinatorial effect.

LIST OF REFERENCE CHARACTERS filter 10
filter housing 12
top shell 14
bottom shell 16
locking elements 18
inlet opening 20
outlet opening 22
service opening 24
filter element 26 longitudinal direction 28 of the filter element 26
frame 30
filter medium body 32
flange 34
seal means 36
clamping wedge 38
joining direction 39
wedge flank 40
wedge stay 42
securing element 44
securing cutout 46
seal surface 48
housing stop 50
filter element stop 52
clamping direction 54
wedge guide 56
positioning projection 58
reinforcement rib 60 of the clamping wedge 38
reinforcement rib 62 of the housing stop 50
housing wedge side 64
filter element wedge side 66
housing-facing first bearing surface 67
housing-facing second bearing surface 68
filter element-facing first bearing surface 69
filter element-facing second bearing surface 70
housing-facing step 72
filter element-facing step 73
wedge base angle 74*a, b*
inflow side 76 filter medium body 32
fastening cutout 78
fastening knob 80
first filter element stop section 81
second filter element stop section 82
stop projection 83
stop projection 84
reinforcement rib 86
mounting rib 88
buffer element 90
securing action 92 against faulty assembly
securing projection 94
sealing lip 96*a-c*
characteristic line 100, 102, 104, 106
Y axis
X axis

What is claimed is:

1. A filter for filtering gaseous fluids, comprising:

a filter housing comprising a raw-side inlet opening, a clean-side outlet opening, and a service opening:

a filter element arranged between the inlet opening and the outlet opening, wherein the filter element is removable from the filter housing and insertable into the filter housing through the service opening;

a clamping wedge arranged in a mounted state between a housing stop of the filter housing and a filter element stop of the filter element and clamping in the mounted state the filter element in a clamping direction against the filter housing, wherein the clamping wedge is configured to be inserted into the filter housing in a joining direction and is configured to be removed from the filter housing opposite to the joining direction;

wherein the filter element comprises a seal surface at a side facing away from the clamping wedge, wherein the filter element rests with the seal surface against the filter housing;

wherein the clamping wedge comprises a housing wedge side facing the housing stop and a filter element wedge side facing the filter element stop;

wherein the housing wedge side comprises a first bearing surface and a second bearing surface separated from each other by a first step;

wherein the filter element wedge side comprises a first bearing surface and a second bearing surface separated from each other by a second step;

wherein the housing wedge side rests against the housing stop in a contact plane and wherein the joining direction extends in or parallel to the contact plane;

wherein the first bearing surface and/or the second bearing surface of the filter element wedge side is positioned at a wedge base angle relative to the joining direction, wherein the wedge base angle amounts to 1° to 20°;

wherein the first step of the housing wedge side is offset relative to the second step of the filter element wedge side in the joining direction.

2. The filter according to claim 1, wherein the wedge base angle of the first bearing surface of the filter element wedge side and the wedge base angle of the second bearing surface of the filter element wedge side are identical.

3. The filter according to claim 1, wherein the first bearing surface of the housing wedge side is parallel to the second bearing surface of the housing wedge side.

4. The filter according to claim 1, wherein the first bearing surface and/or the second bearing surface of the filter element wedge side extends parallel to the seal surface of the filter element.

5. The filter according to claim 1, wherein the first bearing surface and/or the second bearing surface of the filter element wedge side is positioned relative to the seal surface of the filter element at an angle between 0.5° and 10°.

6. The filter according to claim 5, wherein the wedge base angle amounts to twice the angle between the first bearing surface and/or the second bearing surface of the filter element wedge side relative to the seal surface of the filter element.

7. The filter according to claim 5, wherein the first bearing surface of the filter element wedge side is spaced apart farther from the seal surface of the filter element than the second bearing surface of the filter element wedge side.

8. The filter according to claim 1, further comprising a seal means, wherein the seal surface of the filter element is formed at the seal means.

9. The filter according to claim 8, wherein the seal means comprises a seal reaction force, which amounts to one or more values selected from the group consisting of:

between 0.003 and 0.023 Newton per millimeter seal line at a compression of 1 mm:

between 0.005 and 0.068 Newton per millimeter seal line at a compression of 2 mm;

between 0.013 and 0.133 Newton per millimeter seal line at a compression of 3 mm;

between 0.027 and 0.252 Newton per millimeter seal line at a compression of 4 mm;

between 0.049 and 0.415 Newton per millimeter seal line at a compression of 5 mm;

between 0.092 and 0.639 Newton per millimeter seal line at a compression of 6 mm; and between 0.160 and 1.296 Newton per millimeter seal line at a compression of 7 mm.

10. The filter according to claim 8, wherein the seal means comprises at least one seal lip.

11. The filter according to claim 1, wherein the filter element comprises a filter medium body non-detachably fastened to a frame or the filter element is a plastic overmolded filter medium body.

12. The filter according to claim 1, wherein the filter element stop is embodied at a frame of the filter element.

13. The filter according to claim 1, wherein the filter element stop comprises at least two stop projections embodied for being contacted by the first bearing surface and/or the second bearing surface of the filter element wedge side.

14. The filter according to claim 13, wherein the at least two stop projections each comprise a different projection height opposite to the joining direction.

15. The filter according to claim 1, wherein the filter element stop comprises a plurality of stop projections embodied for being contacted by the first bearing surface and/or the second bearing surface of the filter element wedge side.

16. The filter according to claim 15, wherein the plurality of stop projections are spaced apart from each other equidistantly in the joining direction, respectively.

17. The filter according to claim 1, wherein the clamping wedge comprises two wedge flanks and a wedge stay connecting the two wedge flanks to each other, wherein the two wedge flanks are arranged at oppositely positioned sides of the filter element in the mounted state.

18. The filter according to claim 17, wherein the wedge stay comprises at least one securing element configured to captively hold the clamping wedge at the filter housing in the mounted state of the clamping wedge in the filter housing.

19. The filter according to claim 1, comprising a wedge guide configured to laterally guide the clamping wedge in the joining direction, wherein the wedge guide at least partially engages around the clamping wedge.

20. The filter according to claim 19, wherein the wedge guide is embodied at the housing stop or at the filter element stop.

21. The filter according to claim 19, wherein the wedge guide is embodied at the housing stop and at the filter element stop.

22. The filter according to claim 1, wherein the filter element stop comprises a positioning projection extending in the clamping direction and configured to rest on the housing stop upon insertion of the filter element into the filter housing and configured to pre-position the filter element in the clamping direction.

23. The filter according to claim 1, wherein the housing stop comprises parallel reinforcement ribs extending in the clamping direction, wherein the clamping wedge comprises parallel reinforcement ribs extending in the clamping direction, wherein the reinforcement ribs of the clamping wedge and the reinforcement ribs of the housing stop are aligned with each other in the clamping direction in the mounted state of the clamping wedge.

* * * * *